(12) United States Patent
Shepelev et al.

(10) Patent No.: US 10,209,845 B2
(45) Date of Patent: Feb. 19, 2019

(54) SYSTEM AND METHOD FOR INTERFERENCE AVOIDANCE FOR A DISPLAY DEVICE COMPRISING AN INTEGRATED SENSING DEVICE

(71) Applicant: SYNAPTICS INCORPORATED, San Jose, CA (US)

(72) Inventors: Petr Shepelev, Campbell, CA (US); David Sabo, Scotts Valley, CA (US); Joseph Kurth Reynolds, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/107,552

(22) Filed: Aug. 21, 2018

(65) Prior Publication Data

US 2018/0356919 A1   Dec. 13, 2018

Related U.S. Application Data

(63) Continuation of application No. 13/628,040, filed on Sep. 27, 2012, now Pat. No. 10,073,568.

(60) Provisional application No. 61/683,542, filed on Aug. 15, 2012.

(51) Int. Cl.
  *G06F 3/041* (2006.01)
  *G06F 3/044* (2006.01)
  *G06F 3/045* (2006.01)

(52) U.S. Cl.
  CPC ............ *G06F 3/044* (2013.01); *G06F 3/0412* (2013.01); *G06F 3/0418* (2013.01); *G06F 3/045* (2013.01)

(58) Field of Classification Search
  None
  See application file for complete search history.

(56) References Cited

U.S. PATENT DOCUMENTS

| | | |
|---|---|---|
| 5,093,655 A | 3/1992 | Tanioka et al. |
| 5,392,058 A | 2/1995 | Tagawa |
| 5,534,892 A | 7/1996 | Tagawa |
| 5,896,120 A | 4/1999 | Iguchi et al. |
| 6,219,113 B1 | 4/2001 | Takahara |
| 6,239,788 B1 | 5/2001 | Nohno et al. |

(Continued)

FOREIGN PATENT DOCUMENTS

| | | |
|---|---|---|
| CN | 1940842 A | 4/2007 |
| CN | 101051256 A | 10/2007 |

(Continued)

*Primary Examiner* — Stephen T. Reed
(74) *Attorney, Agent, or Firm* — Patterson + Sheridan, LLP

(57) ABSTRACT

Embodiments of the invention generally provide an input device with display screens that periodically update (refresh) the screen by selectively driving electrodes corresponding to pixels in a display line. In addition to updating the display, the input device may perform capacitive sensing using the display screen as a touch area. To do this, the input device uses common electrodes for both updating the display and performing capacitive sensing, and interleaves periods of capacitive sensing between periods of updating the display lines (and pixels) based on a display frame. To avoid noise and mitigate interference during capacitive sensing, the input device may change the capacitive frame rate relative to the display frame rate based on measurements of interference. The changed capacitive frame rate may result in re-timed periods of capacitive sensing based on each display frame.

20 Claims, 10 Drawing Sheets

(56) References Cited

U.S. PATENT DOCUMENTS

| | | |
|---|---|---|
| 6,560,276 B1 | 5/2003 | Long et al. |
| 7,031,886 B1 | 4/2006 | Hargreaves |
| 7,451,050 B2 | 11/2008 | Hargreaves |
| 7,633,566 B2 | 12/2009 | Utsunomiya et al. |
| 2004/0095336 A1 | 5/2004 | Hong et al. |
| 2004/0217945 A1 | 11/2004 | Miyamoto et al. |
| 2005/0135492 A1 | 6/2005 | Jia et al. |
| 2006/0012575 A1 | 1/2006 | Knapp et al. |
| 2006/0114247 A1 | 6/2006 | Brown |
| 2007/0026966 A1 | 2/2007 | Sanchez |
| 2007/0074914 A1 | 4/2007 | Geaghan et al. |
| 2007/0262966 A1 | 11/2007 | Nishimura et al. |
| 2008/0018581 A1 | 1/2008 | Park et al. |
| 2008/0048989 A1 | 2/2008 | Yoon et al. |
| 2008/0055267 A1 | 3/2008 | Wu et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0144743 A1 | 6/2008 | Alderson et al. |
| 2008/0150901 A1 | 6/2008 | Lowles et al. |
| 2008/0180407 A1 | 7/2008 | Utsunomiya et al. |
| 2008/0309625 A1 | 12/2008 | Krah et al. |
| 2008/0309627 A1 | 12/2008 | Hotelling et al. |
| 2008/0309628 A1 | 12/2008 | Krah et al. |
| 2009/0009194 A1 | 1/2009 | Seguine |
| 2009/0079707 A1 | 3/2009 | Kaehler et al. |
| 2009/0160461 A1 | 6/2009 | Zangl et al. |
| 2009/0189867 A1 | 7/2009 | Krah et al. |
| 2009/0195511 A1 | 8/2009 | Cites et al. |
| 2009/0256818 A1 | 10/2009 | Noguchi et al. |
| 2010/0001973 A1 | 1/2010 | Hotelling et al. |
| 2010/0019780 A1 | 1/2010 | Bulea |
| 2010/0045635 A1 | 2/2010 | Soo |
| 2010/0053380 A1 | 3/2010 | Ise |
| 2010/0060591 A1 | 3/2010 | Yousefpor et al. |
| 2010/0066692 A1 | 3/2010 | Noguchi et al. |
| 2010/0079402 A1 | 4/2010 | Grunthaner et al. |
| 2010/0085324 A1 | 4/2010 | Noguchi et al. |
| 2010/0110040 A1 | 5/2010 | Kim et al. |
| 2010/0182273 A1 | 7/2010 | Noguchi et al. |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0214262 A1 | 8/2010 | Ishizaki et al. |
| 2010/0225612 A1 | 9/2010 | Ishizaki et al. |
| 2010/0238134 A1 | 9/2010 | Day et al. |
| 2010/0265210 A1 | 10/2010 | Nakanishi et al. |
| 2010/0289765 A1 | 11/2010 | Noguchi et al. |
| 2010/0295804 A1 | 11/2010 | Takeuchi et al. |
| 2010/0295824 A1 | 11/2010 | Noguchi et al. |
| 2010/0301879 A1 | 12/2010 | Philipp |
| 2010/0302202 A1 | 12/2010 | Takeuchi et al. |
| 2010/0309162 A1 | 12/2010 | Nakanishi et al. |
| 2010/0321034 A1 | 12/2010 | Hargreaves |
| 2010/0321305 A1 | 12/2010 | Chang et al. |
| 2010/0328239 A1 | 12/2010 | Harada et al. |
| 2010/0328255 A1 | 12/2010 | Ishizaki et al. |
| 2010/0328256 A1 | 12/2010 | Harada et al. |
| 2010/0328257 A1 | 12/2010 | Noguchi et al. |
| 2010/0328259 A1 | 12/2010 | Ishizaki et al. |
| 2010/0328274 A1 | 12/2010 | Noguchi et al. |
| 2010/0328291 A1 | 12/2010 | Ishizaki et al. |
| 2011/0025634 A1 | 2/2011 | Krah et al. |
| 2011/0042152 A1 | 2/2011 | Wu |
| 2011/0050585 A1 | 3/2011 | Hotelling et al. |
| 2011/0187677 A1 | 8/2011 | Hotelling et al. |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0267305 A1 | 11/2011 | Shahpamia et al. |
| 2012/0050217 A1 | 3/2012 | Noguchi et al. |
| 2013/0057481 A1 | 3/2013 | Lee |

FOREIGN PATENT DOCUMENTS

| | | |
|---|---|---|
| CN | 1940842 B | 5/2010 |
| EP | 1892605 A2 | 2/2008 |
| EP | 1936479 A1 | 6/2008 |
| EP | 1892605 A3 | 7/2008 |
| EP | 2330493 A2 | 6/2011 |
| JP | 2006106853 A | 4/2006 |
| JP | 2007334606 A | 12/2007 |
| JP | 2008090623 A | 4/2008 |
| JP | 2010072581 A | 4/2010 |
| TW | 200945147 A | 11/2009 |
| WO | WO-0127868 A1 | 4/2001 |
| WO | WO-03019346 A1 | 3/2003 |
| WO | WO-2004045905 A2 | 6/2004 |
| WO | WO-2004046905 A3 | 8/2004 |
| WO | WO-2006054585 A1 | 5/2006 |
| WO | WO-2007003108 A1 | 1/2007 |
| WO | WO-2007012256 A1 | 2/2007 |
| WO | WO-2007102238 A1 | 9/2007 |
| WO | WO-2008050507 A1 | 5/2008 |
| WO | WO-2010009655 A1 | 1/2010 |
| WO | WO-2010137727 A1 | 12/2010 |

SYSTEM AND METHOD FOR INTERFERENCE AVOIDANCE FOR A DISPLAY DEVICE COMPRISING AN INTEGRATED SENSING DEVICE

CROSS-REFERENCE TO RELATED APPLICATIONS

This application is a continuation application of U.S. patent application Ser. No. 13/628,040 filed on Sep. 27, 2012, entitled "SYSTEM AND METHOD FOR INTERFERENCE AVOIDANCE FOR A DISPLAY DEVICE COMPRISING AN INTEGRATED SENSING DEVICE", which claims benefit of U.S. provisional patent application Ser. No. 61/683,542, filed Aug. 15, 2012 entitled "SYSTEM AND METHOD FOR INTERFERENCE AVOIDANCE FOR A DISPLAY DEVICE COMPRISING AN INTEGRATED SENSING DEVICE", which is herein incorporated by reference.

BACKGROUND OF THE INVENTION

Field of the Invention

Embodiments of the present invention generally relate to performing capacitance sensing while updating a display, or more specifically, modifying time periods used for capacitance sensing while updating a display to avoid interference and mitigate noise.

Description of Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

Embodiments of the invention generally provide processing system for a display device having an integrated capacitive sensing device. The processing system includes a driver module comprising driver circuitry coupled to a plurality of common electrodes configured to be driven for display updating and capacitive sensing. The driver module is configured to drive a first common electrode for display updating during a first display line update period of a first display frame, the first display frame occurring at a predetermined display frame rate, and drive a second common electrode for display updating during a second display line update period of the first display frame. The driver module is further configured to drive a first common electrode set comprising at least one of the plurality of common electrodes for capacitive sensing at a capacitive frame rate during a first non-display period of the first display frame, the first non-display period occurring after the first display line update period and before the second display line update period, and the first non-display period being at least as long as the first display line update period. The driver module is configured to operate a second common electrode set comprising at least one of the plurality of common electrodes for interference detection during a second non-display period. The processing system further includes a receiver module coupled to a plurality of receiver electrodes and configured to receive first resulting signals with the plurality of receiver electrodes during the first non-display period and second resulting signals during the second non-display period. The processing system includes a determination module configured to determine an interference measurement based at least in part on the second resulting signals, wherein an amount of the first non-display period which is used for capacitive sensing is adjusted based on the interference measurement.

Embodiments of the invention generally provide a processing system for a display device having an integrated capacitive sensing device. The processing system includes a driver module comprising driver circuitry coupled to a plurality of common electrodes configured to be driven for display updating and capacitive sensing. The driver module is configured to drive a first common electrode for display updating during a first display line update period of a first display frame, the first display frame occurring at a display frame rate, and drive a second common electrode for display updating during a second display line update period of the first display frame. The driver module is further configured to drive a first common electrode set comprising at least one of the plurality of common electrodes for capacitive sensing during a first non-display period at a capacitive frame rate. The first non-display period occurs after the first display line update period and before the second display line update period, and the first non-display period being at least as long as the first display line update period. The driver module is configured to operate a second common electrode set comprising at least one of the plurality of common electrodes for interference detection during a second non-display period. The processing system further includes a receiver module coupled to a plurality of receiver electrodes and configured to receive first resulting signals with the plurality of receiver electrodes during the first non-display period and second resulting signals during the second non-display period. The processing system includes a determination module configured to determine an interference measurement based at least in part on the second resulting signals, wherein the determination module is further configured to adjust an amount of capacitive frames per display frame based on the interference measurement.

Embodiments of the invention may further provide a method for operating a display device having an integrated capacitive sensing device. The method includes driving, a first common electrode of a plurality of common electrodes for display updating during a first display line update period of a first display frame, the first display frame occurring at a display frame rate, wherein the plurality of common electrodes are configured for display updating and capacitive sensing, and driving a second common electrode of the plurality of common electrodes for display updating during a second display line update period of the first display frame. The method further includes operating a first common electrode set comprising at least one of the plurality of common electrodes for interference detection, and receiving first resulting signals from a plurality of receiver electrodes while operating the first common electrode set for interference detection. The method includes determining an interference measurement based at least in part on the first resulting signals, adjusting an amount of a first non-display period which is used for capacitive sensing based on the interference measurement. The method further includes driving a second first common electrode set comprising at least one of the plurality of common electrodes for capacitive sensing during the amount of the first non-display period of the first display frame at a capacitive frame rate. The first non-display period may occur after the first display line update period and before the second display line update period, and the first non-display period is at least as long as the first display line update period.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
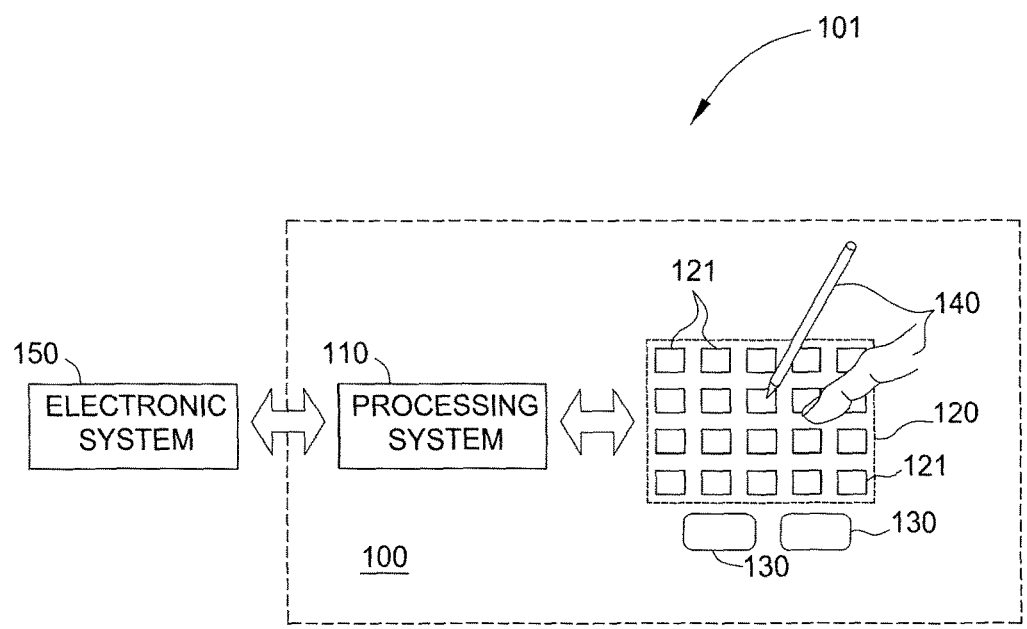
FIG. 1 is a schematic block diagram of an exemplary display device integrated with an input device, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Input devices with display screens periodically update (refresh) the screen by selectively driving electrodes corresponding to pixels in the screen's display lines. In general, the input devices drive each electrode until each display line (and each pixel) of a display frame is updated. As used herein, a display frame includes the necessary information for updating, at least once, a defined portion of the display lines in a display screen. For example, if the input device updates the display screen sixty times a second, the input device receives sixty display frames which the input device uses to update each display line sixty times. Moreover, a display frame may not include all the display lines in the display screen. For example, only a portion of the display screen may be actively displaying an image, and thus, the display frames may contain only the data needed to update the display lines in the active portion.

In addition to updating the display, the input device may perform capacitive sensing using the display screen as a touch area. Moreover, the input device may interleave periods of capacitive sensing between periods of updating the display based on a display frame. For example, the input device may update the first half of the display lines of the display screen, pause display updating, perform capacitive sensing, and finish updating the rest of the display lines. In this manner, the time period necessary for updating a screen based on a single display frame includes one or more interleaved periods of capacitive sensing. Further still, the input device may use common electrodes for both updating the display and performing capacitive sensing.

In one embodiment, the periods of capacitive sensing may be dynamically varied to avoid interference and mitigate noise at the input device. For example, the input device may modify the amount of the interleaved periods used for capacitive sensing, modify the timing of interleaved periods relative to each display frame, or some combination thereof, based on detected interference. Increasing the amount of the interleaved periods used for capacitive sensing enables the input device to increase a range of sensing frequencies for more effective frequency hopping. Further, modifying the timing of interleaved periods relative to each display frame enables the input device to increase a number of capacitive measurements acquired during capacitive sensing for narrower filter bandwidths used in interference filtering.

FIG. 1 is a block diagram of an exemplary input device 100, in accordance with embodiments of the present technology. In one embodiment, input device 100 comprises a display device having an integrated sensing device. Although embodiments of the present disclosure may be utilized in a display device integrated with a sensing device, it is contemplated that the invention may be embodied in display devices without integrated input devices. The input device 100 may be configured to provide input to an electronic system 150. As used in this document, the term "electronic system" (or "electronic device") broadly refers to any system capable of electronically processing information. Some non-limiting examples of electronic systems 150 include personal computers of all sizes and shapes, such as desktop computers, laptop computers, netbook computers, tablets, web browsers, e-book readers, and personal digital assistants (PDAs). Additional example electronic systems 150 include composite input devices, such as physical keyboards that include input device 100 and separate joysticks or key switches. Further example electronic systems 150 include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In one embodiment, the processing system 110 includes a driver module having driver circuitry and configured to drive hardware components for capacitive sensing, display updating, and interference measurement. In some embodiments, the processing system 110 may include a receiver module configured to process resulting signals for capacitive sensing, and a determination module configured to adjust a process for capacitive sensing based at least in part on interference measurements.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device may share physical elements. For example, some embodiments may utilize some of the same electrical components for displaying and sensing. As another example, the display device may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
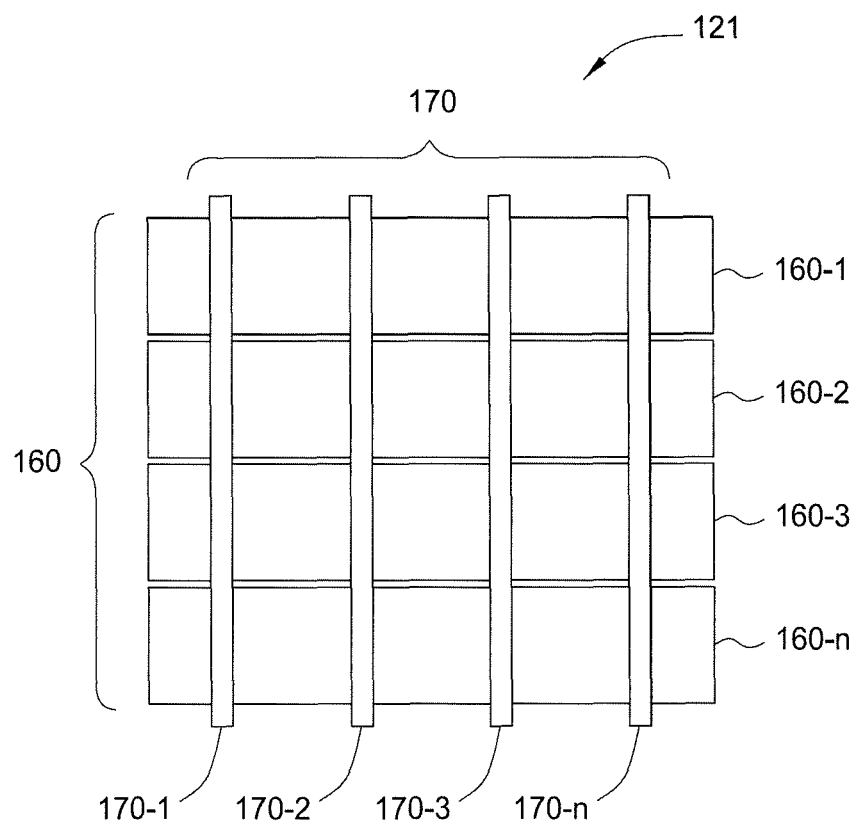
FIG. 2 illustrates a stack-up of a sensor assembly that may be used in the input device to sense the input object, according to an embodiment described herein.

FIG. 2 shows a portion of an exemplary pattern of sensing elements 121 configured to sense in a sensing region associated with the pattern, according to some embodiments. For clarity of illustration and description, FIG. 2 shows the sensing elements 121 in a pattern of simple rectangles, and does not show various components. This pattern of sensing elements 121 comprises a plurality of transmitter electrodes 160 (160-1, 160-2, 160-3, . . . 160-$n$), and a plurality of receiver electrodes 170 (170-1, 170-2, 170-3, . . . 170-$n$) disposed over the plurality of transmitter electrodes 160.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, transmitter electrodes 160 comprise one or more common electrodes (e.g., "V-com electrode") used in updating the display of the display screen. These common electrodes may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), coupled to one end of an organic light emitting diode (OLED) etc. In such embodiments, the common electrode can also be referred to as a "combination electrode", since it performs multiple functions. In various embodiments, each transmitter electrode 160 comprises one or more common electrodes. In other embodiments, at least two transmitter electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g., combination electrodes).

In one embodiment, the capacitive frame rate may be set relative to the display frame rate. In one embodiments, the capacitive frame rate may be an integer multiple (e.g., "2×", "1×") of the display frame rate. In other embodiments, the capacitive frame rate is a fractional multiple (e.g., "1.5×") of the display frame rate. In yet further embodiments, the capacitive frame rate may be any fraction or integer of the display frame rate. By way of example, a capacitive frame rate that is configured as "2×" of a display frame rate of 60 Hz would have a rate of 120 Hz. Similarly, a capacitive frame rate that is configured as "1.5×" would have a rate of 90 Hz.

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats. In some embodiments, there may be "n" capacitive images for every display updating state.

Performing Capacitive Sensing Between Display Line Updates

A common electrode may be configured to transmit signals for display updating during the pixel update period. In one embodiment, each common electrode of a plurality of common electrodes sequentially transmits signals for display updating. In various embodiments, multiple common electrodes may transmit signals for capacitive sensing during a non-display update period. In one embodiment, the non-display update period comprises at least one of a horizontal blanking period, an in-frame blanking period and a vertical blanking period, as shown in greater detail in FIG. 3.

Figure 3:
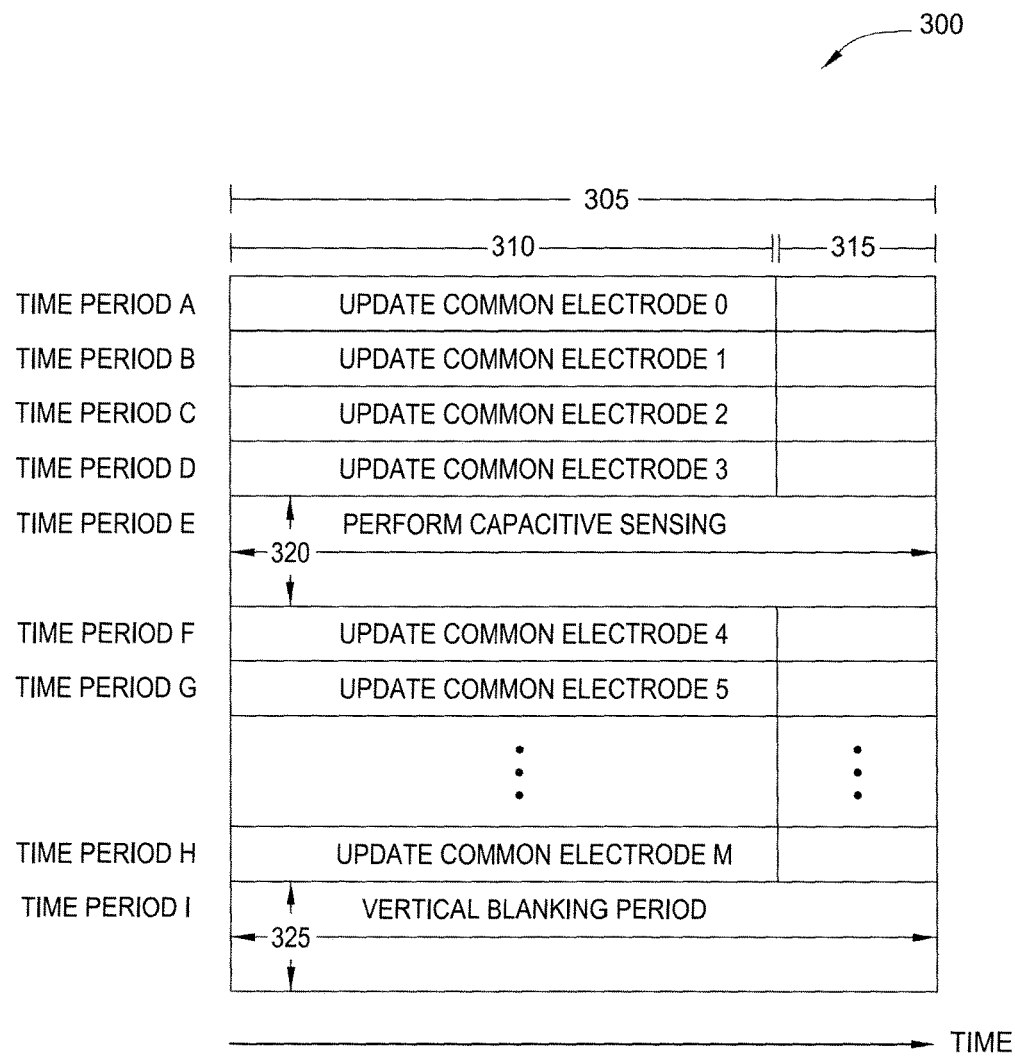
FIG. 3 is a timing chart for processing a display frame with interleaved capacitive sensing periods, according to one embodiment disclosed herein.

FIG. 3 is a timing chart 300 for processing a display frame with interleaved capacitive sensing periods, according to one embodiment disclosed herein. Specifically, the timing chart 300 illustrates the different time periods in a display frame. As shown, different time periods are designated during which common electrodes 0-N may sequentially transmit signals for display updating during a corresponding "pixel update" period in the display frame. Time periods A-D, F-H each represent the time used to update a single display line of a display screen in the input device, such as the input device 100. This display line update time is further divided into a time period 310 used to update the pixels of the display line and a buffer time, also referred to as a horizontal blanking period 315, that occurs between each display line update 305. The driver module may use the horizontal blanking period 315 to, for example, retrieve data needed to update the next display line, drive a voltage onto the common electrode(s) corresponding to the display line, or allow signals to settle to reduce interference when updating subsequent display lines. Nonetheless, the embodiments disclosed herein are not limited to an input device with a horizontal blanking period 315 and may be used in a system where there is no buffer time between the pixel update period 310 and the next display line update 305. In various embodiments, the horizontal blanking period 315 is reduced in length such that it is substantially non-existent. In other embodiments, the horizontal blanking period 315 is reduced in length such that it is no longer than the time needed to configure a common electrode to update a display line.

Moreover, the common electrodes 0-N may be driven to update pixels of the display frame in any order. For example, the driver module may update a display line at the top of the display screen, and in the subsequent display line update 305, update a display line at the bottom of the screen. As a result, the input device may sequentially drive two common electrodes that are not located sequentially in the display screen. Further still, a display frame may not update each display line of the display screen if, for example, only a portion of the display screen is actively displaying information. Thus, the common electrodes 0-N in chart 300 may represent only a portion of the common electrodes in the input device.

In one embodiment, the time period E represents the time for capacitive sensing, or a capacitive sensing period. Time Period E may be at least as long as the time to update a single line of the display screen. In another embodiment, time period E is longer than the time to update a single line of a display screen. Moreover, the input device may use the same common electrodes used to update the pixels of the display screen to drive transmitter signals. That is, the common electrodes may serve dual purposes. During a display update period, a common electrode updates the pixels in the display, but during a capacitive sensing period, the common electrodes are used as transmitter electrodes.

In one embodiment, after updating display lines during time periods A-D, the driver module may pause display updating and use time period E to perform capacitive sensing. During this time period, the driver module may not update any of the pixels in the display screen. Rather, the driver module may transmit transmitter signals on transmitter electrodes (e.g., one or more common electrodes) in the display screen. Based on the resulting signals received by the receiver electrodes 170, the input device derives positional information of an input object proximate to a touch sensitive area of the device.

In one embodiment, the driver module may pause updating the display in order to perform capacitance sensing. As shown in chart 300, the driver module updates the pixels associated with common electrodes 0-3 during time periods A-D. However, at time period E, display updating is paused (i.e., the driver module does not continue to update the next display line in the frame) while capacitive sensing is performed. Specifically, the capacitive sensing periods are interleaved with the display line updates of the display frame. Accordingly, the capacitive sensing period 320 is also referred to interchangeably as a long horizontal blanking period (long h-period), distributed vertical blanking period, or an in-frame blanking period, where display updating is paused while the driver module performs capacitive sensing prior to completion of display updating of an entire display frame. The driver module resumes display updating for the same display frame after the capacitive sensing period 320 is completed.

As shown in FIG. 3, the capacitive sensing periods 320 occur between groups of pixel update periods 310 of a display frame. In one embodiment, the capacitive sensing periods 320 are longer than the horizontal blanking periods 315 and, in some embodiments, are at least as long as a pixel update period 310 or the display line update 305. Stated differently, the driver module may perform capacitance sensing during the entire time period E which includes the capacitive sensing period 320 that is at least as long as a pixel update period 310 and a horizontal blanking period 315. As shown, time period E is three times as long (as shown by the horizontal and vertical arrows) as other time periods in chart 300—i.e., time periods A-D and F-H. However, the duration of the capacitive sensing periods 320 may be adjusted according to the particular design of the input device.

Allowing the capacitive sensing to occur during the capacitive sensing period 320 may allow the input device to measure accurately the change in capacitance for the selected electrodes (i.e., electrodes driving the transmitter signal) without interruption. Accordingly, performing capacitive sensing during an capacitive sensing period 320 is referred to herein as contiguous capacitive sensing since change in capacitive coupling is measured for a selected electrode or group of electrodes in a continuous time period.

Furthermore, the driver module may perform capacitive sensing using the electrodes that were used in the previous display update period. For example, during time period E, the driver module may transmit a transmitter signal simultaneously on common electrodes 0-3. In this manner, the driver module may use one or more common electrodes to update the pixels in a display line and, before continuing to update the other display lines in the display frame, perform capacitive sensing using those same electrodes.

When display updating is paused, the driver module may still drive signals on the common electrodes that are not transmitting the transmitter signal. For example, while the transmitter signal is transmitted on one or more electrodes, the driver module may apply a reference voltage (or another other signal) to other common electrodes in the display screen. Fixing the common electrodes currently not being used for capacitive sensing to a reference voltage may improve the ability of the input device to derive accurate positional information for the input object. Thus, when display updating is paused, the driver module may cease to update the pixels in the display screen but still use the common electrodes for capacitive sensing.

The vertical blanking period 325 is the period between the last display line update period of a display frame and the beginning of a display line update period in a subsequent display frame. Although not shown in FIG. 3, the timing chart 300 may also include a second vertical blanking period at the beginning of updating a display based on a received display frame—i.e., before time period A. Because the input device does not update the display during these vertical blanking periods 325, in some embodiments, the driver module may also use either the first or the second vertical blanking periods (or both) to perform capacitance sensing. Similar to the capacitive sensing period 320, the vertical blanking periods 325 facilitate contiguous capacitive sensing since both of these blanking periods may provide a sufficient length of time to measure the change in capacitance associated with a selected common electrode without significant interruptions. However, the vertical blanking period 325 is distinguished from the capacitive sensing period 320 since this period 325 falls before or after all of the display lines of the display frame have been updated, while the capacitive sensing period 320 is inserted between display line updates 305 of the same display frame. For example, as shown in FIG. 3, a capacitive sensing period 320 (e.g., during time period E) occurs after a common electrode 3 transmits signals for display updating (e.g., during time period D) and before common electrode 4 transmits signals for display updating (e.g., during time period F).

In many embodiments, the length of a horizontal blanking period 315, capacitive sensing period 320 and/or a vertical blanking period 325 may be changed. However, the display frame rate may be fixed. Therefore, as the length of one of these non-display update periods is changed, at least one of the other non-display update periods may also change so that the length of the display frame does not change. For example, in an embodiment where a capacitive sensing period 320 is included within the display frame, the duration of the horizontal blanking periods 315 and/or the vertical blanking period 325 may be decreased correspondingly. By reducing the horizontal blanking periods 315 corresponding to the display line update periods 305 of a first set of common electrodes, a capacitive sensing period 320 may be inserted within a display frame. For example, the length of the horizontal blanking periods 315 may be reduced such that a capacitive sensing period 320 is at least as long as a pixel update period 310, or alternatively, is longer than the pixel update period 310. Given that a horizontal blanking period 315 is "T" μs long, reducing the horizontal blanking period 315 by about "N" μs for "M" corresponding common electrodes results in an capacitive sensing period 320 of length "(T−N)*M" μs being created. The duration of a capacitive sensing period 320 may be based on a sum of the reduction of each horizontal blanking period 315. In other embodiments, the duration of the capacitive sensing period 320 may be based on changing the vertical blanking period 325, or based on changing both the horizontal blanking periods 315 and the vertical blanking period 325. The duration of a capacitive sensing period 320 may be set according to, for example, the amount of time required to perform contiguous capacitive sensing for a corresponding group of common electrodes. For example, for a group of common electrodes, 100 μs may be needed for contiguous capacitive sensing. Therefore, a corresponding capacitive sensing period 320 is determined to be at least 100 μs in length. To free up 100 ps but still maintain the desired frame rate, one or more of the horizontal blanking periods 315 or the vertical blanking period 325 may be reduced.

In one embodiment, the duration and occurrence of the in-frame blanking period(s) 320 may be set to mitigate noise from switching between capacitive sensing and display updating, or to perform frequency hopping to reduce noise interference. In some embodiments, a change in the capacitive frame rate relative to the display frame rate based on interference measurements may result in a re-timing of the capacitive sensing periods 320. For example, to change a capacitive frame rate from 2× to 1× the display frame rate (which is typically about 60 Hz), one or more capacitive sensing periods 320 may be increased from being equal to a pixel update period 310 to being longer than (e.g., twice) a pixel update period 310. In this example, one or more capacitive sensing periods 320 may be re-timed to occur once per display frame rather than twice per display frame.

Even though FIG. 3 was described in an embodiment where common electrodes 0-N are used for both updating a display and performing capacitive sensing, this disclosure is not limited to such. In one embodiment, the input device may use in-frame blanking periods to perform capacitive sensing even if the transmitter signals are transmitted on electrodes that are not used when updating the display. In other embodiments, the transmitter electrodes may be separate from the common electrodes. Because the electrodes used for display updating and the electrodes used for capacitive sensing may be in close proximity in the input device, performing the two functions in mutually exclusive time periods may reduce the amount of electrical interference between the different electrode sets.

Figure 4:
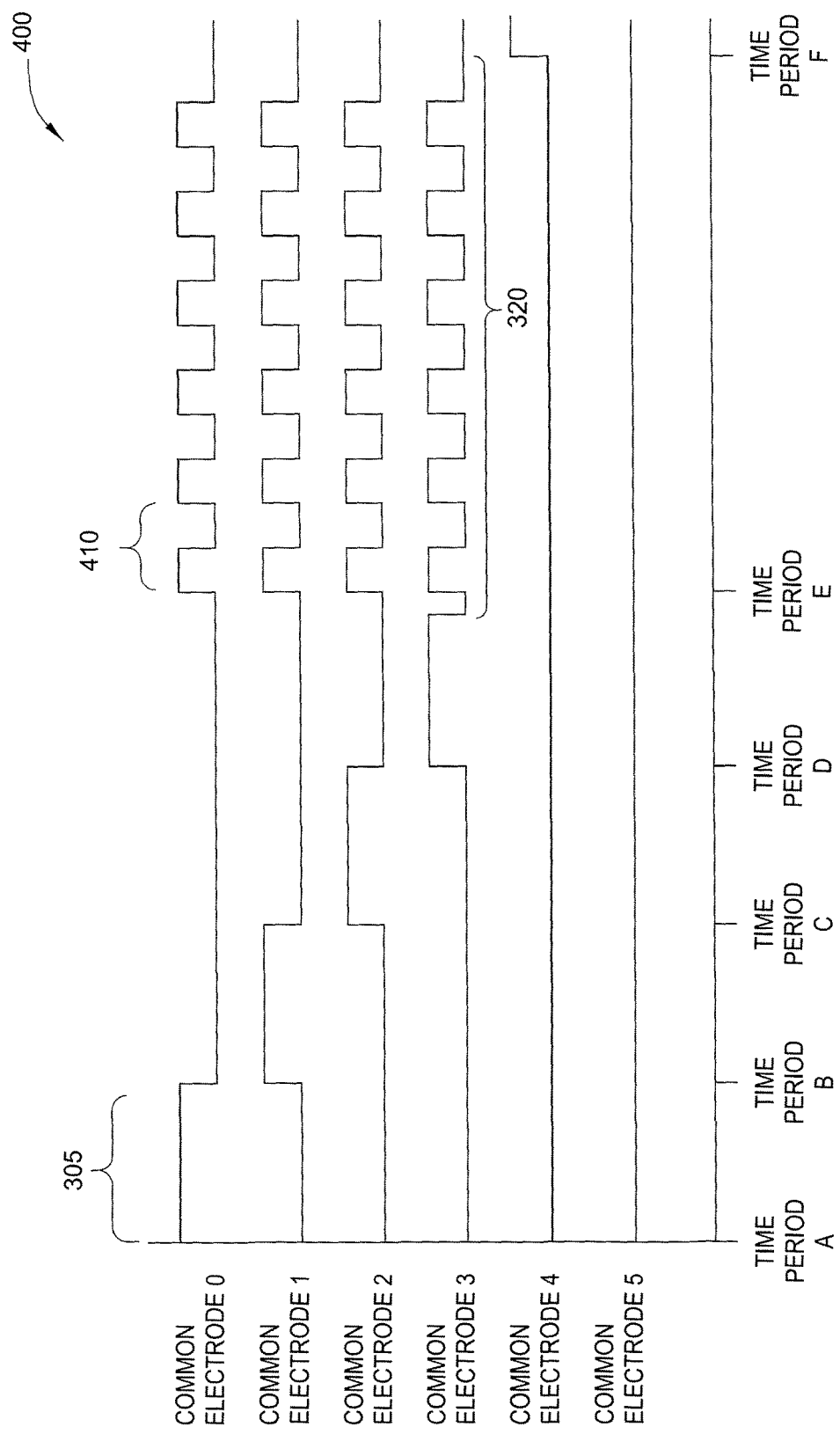
FIG. 4 is a timing diagram for interleaving a capacitive sensing period into a display frame update, according to one embodiment disclosed herein.

FIG. 4 is a timing diagram for interleaving a capacitive sensing period into a display frame update, according to one embodiment disclosed herein. The timing diagram 400 includes the waveforms propagated on common electrodes 0-5 during the time periods A-F shown in FIG. 3. In the embodiment shown, the horizontal blanking periods 315 of the display line update 305 have been set to 0 and omitted from FIG. 4 for clarity of illustration.

During time periods A-D, the driver module activates, i.e., drives a signal onto, one of the common electrodes and updates the pixels associated with the corresponding display line. While one electrode is activated, the other electrodes may be kept at a constant voltage. Moreover, the common electrodes may not switch instantaneously at each time period as shown (e.g., electrode 0 switches off as electrode 1 switches on). Instead, there may be some delay—e.g., the horizontal blanking period—where the electrodes ramp up or ramp down. In various embodiments, one or more common electrode may be activated in an overlapping manner, such that at least two common electrodes are activated during the time period. For example, common electrode 0 and common electrode 1 may both be activated during overlapping portions of Time Period A.

During time period E, the driver module pauses display updating and switches to capacitive sensing. In FIG. 4, the common electrodes 0-3 are grouped into a transmitter electrode block (e.g., transmitter electrode $170_1$) where a transmitter signal (e.g., square wave) is transmitted simultaneously on each common electrode assigned to the block. For example, a display device may include hundreds of common electrodes but, when performing capacitance sensing, the device may segment the common electrodes into blocks of transmitter electrodes (e.g., around 20 transmitter electrodes of 40 common electrodes each) where each block is treated as a single transmission electrode. For simplicity, FIG. 4 illustrates an embodiment where common electrodes 0-3 are assigned to a transmitter electrode and are each driven with the same transmitter signal. Alternatively, in other display devices, the common electrodes may be a single electrode "plane" made up of a plurality of electrode segments are driven to a same reference voltage during display updating. During capacitive sensing however, the different electrode segments (i.e., transmitter electrodes) of the electrode plane are used to transmit the transmitter signals at different times. Further, in other embodiments, during Time Period E, one or more common electrodes may be operated for interference sensing. In such embodiments, operating the one or more common electrodes for interference sensing comprises driving the one or more common electrodes with a substantially constant voltage signal or electrically floating the one or more common electrodes.

The capacitance sensing period may further be divided into a plurality of sensing cycles 410 (or touch cycles). Advantageously, using an in-frame blanking period may permit the driver module to drive a plurality of contiguous sensing cycles sufficient for deriving a change in capacitance between the electrode block and one or more receiver electrodes. For example, assuming the input device performs six sensing cycles 410 in order to accurately measure the change of capacitance but can only perform two sensing cycles 410 during a horizontal blanking period 315, the driver module must use at least three horizontal blanking periods 315 for each electrode block. Conversely, with the capacitive sensing period 320 shown in FIG. 4, the much longer length of the capacitive sensing period 320 allows the input device to measure the six sensing cycles 410 contiguously without updating the display between the sensing cycles 410.

Of course, the input device may be configured to perform more or less than six cycles during a capacitive sensing period 320. Moreover, the input device may perform capacitance sensing on multiple electrode blocks during a single capacitive sensing period 320. For example, the driver module may drive the necessary sensing cycles 410 on common electrodes 0-3 and then drive the necessary sensing cycles on common electrodes 4-7 (not shown). Further still, the driver module may also drive a voltage on the other common electrodes that are not used for capacitance sensing during the in-frame blank period 320. That is, instead of permitting the voltage on the other common electrodes (e.g., common electrode 4 and 5) to float, the driver module may drive a DC voltage (e.g., a reference voltage) on these electrodes.

In one embodiment, the input device may transmit a transmitter signal on multiple transmitter electrodes (e.g., sets of common electrodes) simultaneously. Although not shown, the driver module may output a different transmitter signal on each transmitter electrode based on a multiplexing schema such as code division multiplexing or orthogonal frequency division multiplexing. Thus, the embodiments disclosed herein are not limited to transmitting the same transmitter signal on a subset of the common electrodes but may transmit different transmitter signals on a plurality of transmitter electrodes simultaneously in order to measure the change of capacitance between the transmitter electrodes and the receiver electrodes. Further, while FIG. 4 illustrates a single in-frame blanking period, multiple in-frame blanking periods may occur during a display frame.

In one embodiment, a display frame (refresh) rate is related to the number of common electrodes, the length of the row update period, the length of the in-frame blanking period, and the length of the vertical blanking period. Consider an example where the display device has 800 rows (common electrodes) with a row update time 20 µs (pixel update period of 15 µs and a horizontal blanking period of 5 µs) per common electrode. Further, in this example, the vertical blanking period is 10 rows long, for a total of 810 rows and the in-frame blanking period is essentially 0 µs. Therefore, the display frame rate is 1/(810*20 µs) which is about 60 Hz.

In one embodiment, visual artifacts within a display image due to display update interruption may be reduced by varying properties of the in-frame blanking period from display frame to display frame. In some embodiments, the duration of the in-frame blanking periods may vary from display frame to display frame. In further embodiments, the position of the in-frame blanking periods may vary randomly or modulate from display frame to display frame. For example, the common electrode that is driven for display updating before the start of an in-frame blanking period the common electrode that is driven row display updating following an in-frame blanking period may change from display frame to display frame. In some embodiments, the duration of in-frame blanking periods may vary independently from each other. In other embodiments, the position of in-frame blanking periods may vary independently from each other. In various embodiments, the duration of at least two in-frame blanking periods are varied in the same way: varied in either duration and/or position. In yet further embodiments, both the duration and position for in-frame blanking periods may vary from display frame to display frame.

Interference Avoidance Through Changing Capacitive Frame Rate

In one embodiment, noise may be mitigated and susceptibility to interference in touch measurements during capacitive frames may be reduced by varying properties of the non-display update period (e.g., capacitive sensing period) from display frame to display frame. In some embodiment, the processing system 110 may modify properties of the non-display update period based on measurements for interference and noise. In some embodiments, the processing system 110 may change the amount of a non-display update period used for capacitive sensing, change the capacitive frame rate relative to the display frame rate, or some combination thereof based on interference measurements. By dynamically decreasing the capacitive frame rate based on interference measurements, the processing system 110 uses additional time to acquire more samples, which allows for narrower filter bandwidths for filtering resulting signals received on the receiver electrodes. Further, the additional time afforded by the decrease in capacitive frame rate enables the processing system 110 to increase the range of sensing frequencies available for frequency hopping and more effectively avoid interference.

Figure 5:
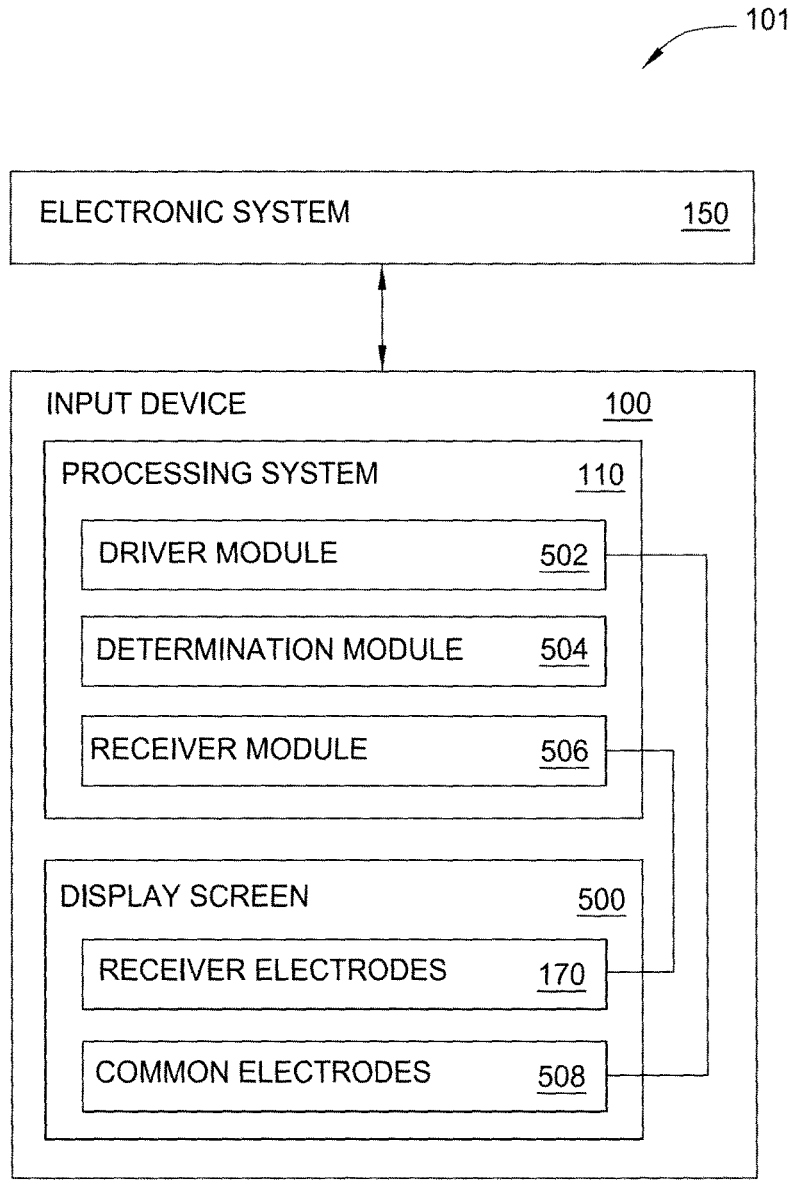
FIG. 5 illustrates a system for communicating between an electronic system and an input device that dynamically changes a capacitive frame rate relative to a display frame rate, according to one embodiment disclosed herein.

FIG. 5 illustrates a system for communicating between an electronic system and an input device that dynamically changes a capacitive frame rate relative to a display frame rate, according to one embodiment disclosed herein. In one embodiment an electronic system 150 is coupled to an input device 100. As mentioned in regards to FIG. 1, the electronic system 150 broadly refers to any system capable of electronically processing information. Some non-limiting examples of electronic systems 150 include personal computers of all sizes and shapes, such as desktop computers, laptop computers, netbook computers, tablets, web browsers, e-book readers, and personal digital assistants (PDAs). The electronic system 150 may transmit data, such as display frames, to the input device 100 for display.

The input device 100, in one embodiment, may be configured to provide input to an electronic system 150 as well as receive and process display data transmitted from the electronic system 150. The input device 100 includes a display screen 500 and a processing system 110. The display screen 500 includes a plurality of pixels arranged as one or more display lines that are updated based on display frames received from the electronic system 150.

The processing system 110 is configured to operate the hardware of the input device 100 to detect input in the sensing region—e.g., some portion of the display screen 500. The processing system 110 comprises parts of or all of one or more integrated circuits (ICs) and/or other circuitry components. As shown, the processing system 110 includes at least a driver module 502, a receiver module 506, and a determination module 504. In one embodiment, the driver module 502 may include driver circuitry coupled to the plurality of common electrodes 508 of the display screen 500 configured to be driven for display updating and capacitive sensing. The driver module 502 is configured to drive one or more of the common electrodes 508 for display updating during display line update periods (e.g., pixel update periods 315) of a display frame. The driver module 502 may be configured to drive the common electrodes 508 such that the display frames occur at a pre-determined display frame rate.

In one embodiment, the driver module 502 may be configured to drive one or more common electrode sets (e.g., transmitter electrode 160) for capacitive sensing during non-display update periods (e.g., capacitive sensing periods 320). In one embodiment, the determination module 504 may configure the timing and duration of the non-display update periods based on a capacitive frame rate. In some embodiments, the non-display update periods may occur after a first display line update period and before a second display line update period of a display frame. In various embodiments, a non-display update period may be at least as long as the first display line update period. In one embodiment, the driver module 502 may be configured to operate one or more of the common electrodes 508 for interference detection during a non-display update period.

In one embodiment, the receiver module 506 is coupled to a plurality of receiver electrodes 170 and configured to receive resulting signals with the plurality of receiver electrodes 170. In some embodiments, the receiver module 506 is configured to receive first resulting signals during a first non-display period and second resulting signals during a second non-display period.

In one embodiment, the determination module 504 is configured to determine an interference measurement based at least in part on the second resulting signals. In some embodiments, the determination module 504 is configured to adjust the capacitive frame rate relative to the display frame rate based on the interference measurement. In one embodiment, the determination module 504 may control the driver module 502 to change duration and timing of the non-display update periods based on the adjusted capacitive frame rate. In one embodiment, the determination module 504 may adjust an amount of the first non-display period which is used for capacitive sensing based on the interference measurement. In some embodiments, the determination module 504 is configured to adjust a length of the non-display update periods based on the interference measurement.

In some embodiments, the determination module 504 is configured to adjust the capacitive frame rate relative to the display frame rate, and drive the first common electrode set for capacitive sensing during a third non-display period of the first display frame, the third non-display period occurring after the first non-display period, the first and third non-display periods comprising a capacitive frame. In some embodiments, the determination module 504 is configured to adjust the amount of the second non-display period which is used for capacitive sensing by shifting from driving the first common electrode set with a first transmitter signal having a first frequency to driving the first common electrode set with a second transmitter signal having a second frequency, wherein the first frequency is different from the second frequency.

Figure 6:
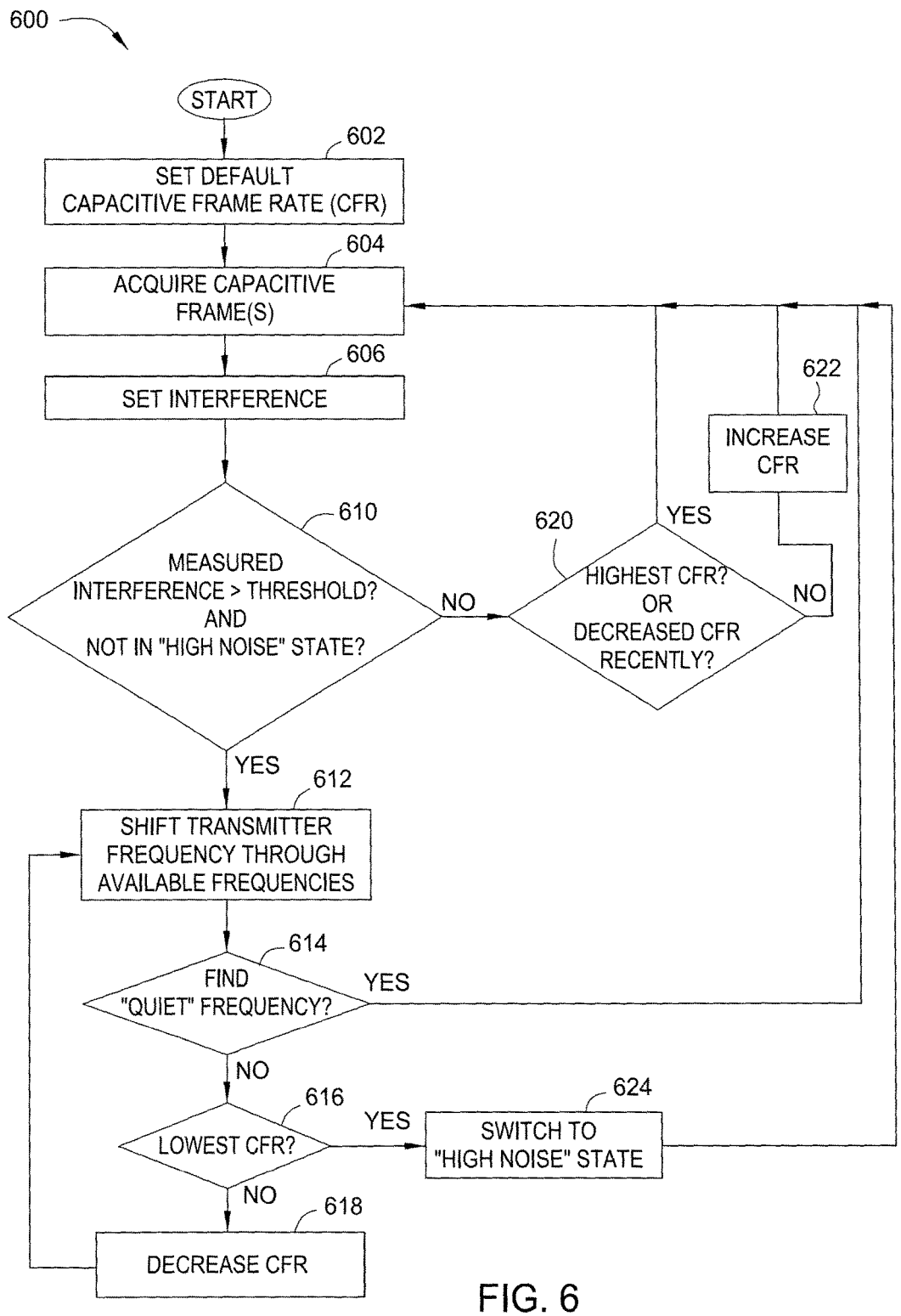
FIG. 6 illustrates a flow diagram of a method of mitigating noise by modifying periods of capacitance sensing with display updating, according to an embodiment disclosed herein.

FIG. 6 illustrates a method of mitigating noise during capacitance sensing by modifying a capacitive frame rate relative to a display frame rate for display updating, according to an embodiment disclosed herein. FIG. 6 illustrates a single implementation, and other implementations are possible. Further, in other implementations all of the illustrated "states" and processes may not be used. For example, there may not be a "high noise" state in various embodiments. Further the order in which the different processes and states may be varied in other embodiments.

The method 600 begins at step 602 with the processing system 110 setting default properties for the capacitive frame and the non-display update period used for capacitive sensing, such as a default capacitive frame rate. In one embodiment, the capacitive frame rate may be expressed relative to the display frame rate. For example, the capacitive frame rate may be represented by a ratio "R" between the capacitive frame period and the display frame period (e.g., $R=T_{touch}/T_{display}$).

In one embodiment, different baselines may be used for each capacitive frame rate. Further, in various embodiments, a baseline may be relaxed or adjusted in some other way that it may be used with the different capacitive frame rates.

In some embodiments, the default capacitive frame rate can be set at a highest available value (e.g., as configured by the input device), the lowest available value, or any value in between. In one embodiment, the capacitive frame rate may be set based on an overall risk of interference. For example, if there is a relatively high risk of there being a relatively high level of interference, then a lower capacitive frame rate may be selected (e.g., by reducing the ratio R). However, if there is a relatively low risk of there being a relatively high level of interference, then a higher capacitive frame rate may be selected.

At step 604, the processing system 110 acquires one or more capacitive frame. In one embodiment, the driver module drives a set of one or more of the common electrodes for capacitive sensing during the non-display update period, and the receiver module receives resulting signals from receiver electrodes. In various embodiments, multiple common electrode sets may be simultaneously driven with transmitter signals during a non-display update period (e.g., capacitive sensing period), where each transmitter signal is based on different ones of a plurality of codes, including code division multiplexing, orthogonal frequency-division multiplexing, pseudorandom codes, Walsh codes, Hadamard codes, Gold codes, or the like. Further the plurality of codes may be based on any plurality of codes that are able to provide mathematical independent results.

At step 606, the processing system 110 estimates interference by acquiring a measurement of interference. An interference measurement may be acquired using any known method. In one embodiment, processing system 110 is configured to operate one or more of the common electrodes for interference sensing while receiving resulting signals with the receiver electrodes. A measurement of the interference may then be determined based on the resulting signals. Operating the common electrodes for interference sensing may include electrically floating or driving the common electrodes with a substantially constant voltage. In some embodiments, a first capacitive frame or a first set of capacitive frames (e.g., touch frame(s)) may be acquired and a measure of the interference may then be determined based on one more of the capacitive frames.

In various embodiments, the processing system 110 processes the acquired capacitive frames. In one embodiment, the processing system 110 modifies the capacitive frame rate based on the interference measurement. In some embodiments, the processing system 110 may decrease the capacitive frame rate relative to the display frame rate if the interference measurement meets or exceeds some threshold value. In other embodiments, the processing system 110 may increase the capacitive frame rate relative the display frame rate if the interference measurement does not exceed the threshold value. As such, at step 610, the processing system 110 determines whether the interference measurement (e.g., acquired at step 606) meets or exceeds a threshold value. In one embodiment, the processing system 110 may further determine to adjust the capacitive frame rate based on whether the processing system 110 has entered into a logical "high noise" state, which is discussed later.

At step 612, if the estimated interference exceeds a threshold value, the processing system 110 may modify the transmitter signal frequency used to drive the common electrodes and shift to a different transmitter signal frequency. In one embodiment, the processing system 110 may modify the amount of the non-display update period which is used for capacitive sensing based on the interference measurement. By changing the amount of the non-display update period used for capacitive sensing, the processing system 110 may increase the range of sensing frequencies available for frequency hopping.

In one embodiment, common electrodes are configured to transmit a first transmitter signal for capacitive sensing during the non-display update period (e.g., capacitive sensing period), the first transmitter signal having a first transmitter frequency. Receiver electrodes 170 receive resulting signals that comprise effects corresponding to the first transmitter signal and a measurement of the interference of the first transmitter signal may be acquired based on the resulting signals. In one embodiment, the processing system 110 is configured to shift from transmitting a first transmitter signal having a first frequency to transmitting a second transmitter signal having a second frequency different from the first frequency, based on the measurement of interference.

In one embodiment, when the measurement of interference is above a threshold, the processing system 110 is configured to shift from transmitting a first transmitter signal having a first frequency to transmitting a second transmitter signal having a second frequency, where the first and second frequencies are different. In yet other embodiments, the processing system 110 shifts from transmitting a first transmitter signal to a second transmitter signal based on the measurement of interference, where the second transmitter signal comprises at least one of a different amplitude, phase, polarity, frequency and waveform. The waveform may be one of a square waveform, triangular waveform, sawtooth waveform, sinusoidal waveform, or the like. A shift to different transmitter signal frequencies is shown in greater detail in FIG. 7.

Figure 7:
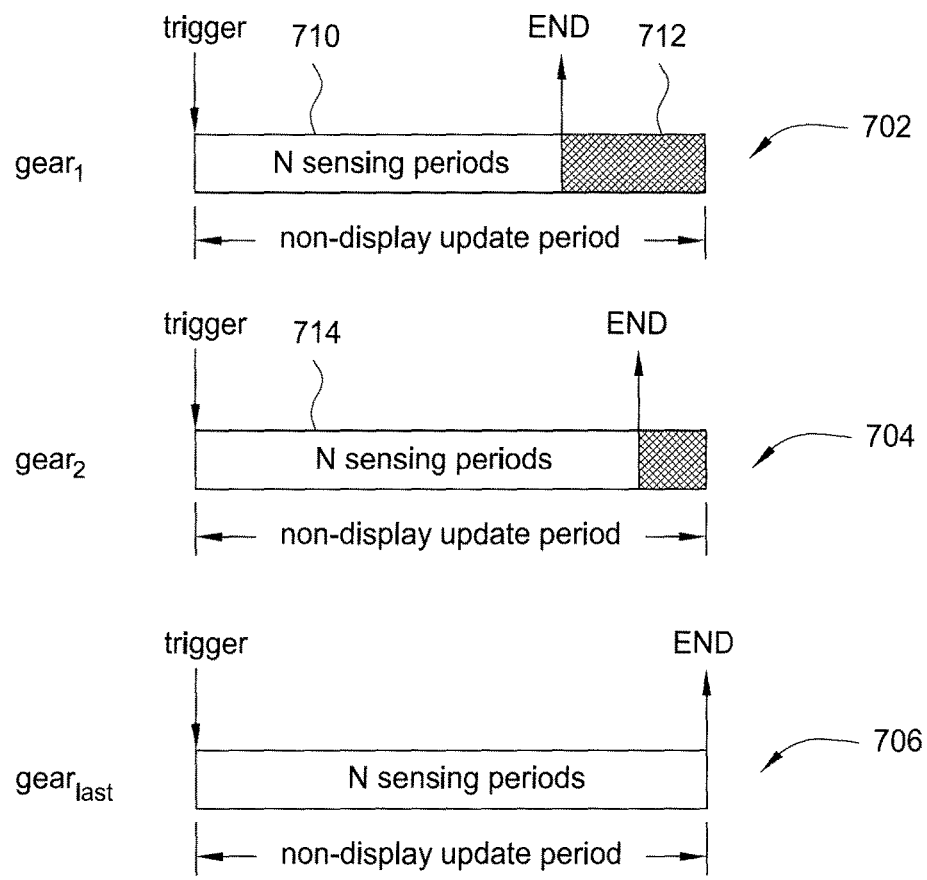
FIG. 7 is a timing chart for processing a display frame with interleaved capacitive sensing periods, according to one embodiment disclosed herein.

In the embodiment of FIG. 7, three different non-display update periods 702, 704, 706 (e.g., in-frame blanking periods) are illustrated, where each non-display update period is related to a different "gear". Each gear represents a different amount of the non-display update period that is used for capacitive sensing. Further, each gear is related to a different transmitter signal frequency that is driven onto a common electrode set (e.g., transmitter electrode) for capacitive sensing. As shown, $gear_1$ may represent a first transmitter signal frequency, $gear_2$ may represent a second transmitter signal frequency and $gear_{last}$ may represent the last transmitter signal frequency available given the duration of the non-display update period. Further, as is illustrated, the first transmitter signal frequency is higher than the second transmitter signal frequency, which are both higher than the last transmitter signal frequency.

It should be recognized that the processing system 110 may use less than all of the time in a non-display update period (e.g., capacitive sensing period 320) for capacitive sensing. For example, the processing system 110 drives common electrodes for capacitive sensing at a first transmitter signal frequency corresponding to $gear_1$ for an amount (identified as period 710) of the non-display update period 702. As shown, the processing system 110 drives a plurality of N sensing cycles during the period 710; the remainder of the non-display update period 702 (identified as period 712) may be unused or reserved for uses other than capacitive sensing.

In one embodiment, processing system 110 is configured to adjust an amount of the non-display update period that is used for capacitive sensing based on a measurement of interference. For example, the processing system 110 may shift from $gear_1$ to $gear_2$ based on a measurement of the interference. To shift transmitter signal frequencies, the processing system 110 may use an increased amount of the non-display period 704 (identified as period 714) for driving common electrodes at a second transmitter signal frequency corresponding to $gear_2$. As shown, in some embodiments, the amount 714 of the non-display update period 704 may be longer than the amount 710 of the non-display update period 702 used for capacitive sensing. Further, processing system 110 may shift from $gear_2$ to $gear_1$ based on a measurement of the interference.

Referring back to FIG. 6, when the measurement of interference is determined to meet or exceed a threshold amount of interference, the amount of the non-display update period that is used for capacitive sensing is adjusted such that the processing system shifts to different gear. At step 614, if a "quiet" gear (e.g., a gear that allows the interference measurement to fall below the threshold level) is found, then the processing system 110 loops to step 604 to acquire at least another capacitive frame using that gear. If a "quiet" gear is not found, the processing system 110 may then determine if the capacitive frame rate can be adjusted relative to the display frame rate.

At step 616, the processing system 110 first determines whether an adjusted capacitive frame rate is available, for example, if the lowest configurable capacitive frame rate is already being used. If there is an availability to adjust the capacitive frame rate, at step 618, the capacitive frame rate is adjusted and a "quiet" gear at that adjusted frame rate is found. As such, the processing system 110 may modify a combination of the length of the non-display update period, which is related to changing the capacitive frame rate, and the amount of the non-display update period used for capacitive sensing, which is related to changing the transmitter signal frequency, based on the measurement of interference. If there are no available capacitive frame rates to adjust to (e.g., already at a minimum capacitive frame rate accepted by the processing system 110), at step 624, the processing system 110 switches or enters a "high noise" state, which is a logic state indicating the input device 100 is affected by a relatively high level noise and interference. In such a state, in some embodiments, the processing system 110 may stop reporting positional information until the processing system 110 is determined to be no longer operating in a "high noise" state. In various embodiments, the processing system 110 may change any of its operating modes or characteristics, for example, to employ other supplemental techniques for mitigating noise and interference, until it is determined to be no longer operating in a "high noise" state.

In the embodiment shown, referring back to step 618, the processing system 110 decreases the capacitive frame rate relative to the display frame rate based on the measurement of interference. In one embodiment, decreasing the capacitive frame rate may result in a change in timing of the non-display update periods relative to the display frames. In some embodiments, decreasing the capacitive frame rate includes increasing the length of the non-display update periods (e.g., in-frame blanking periods) while also decreasing the number of non-display update periods per display frame. In another embodiment, decreasing the capacitive frame rate includes switching from driving a common electrode set during a single non-display period to acquire a capacitive frame to driving the same common electrode set during multiple non-display update periods (e.g., in-frame blanking periods) to acquire at least a portion of a capacitive frame. In one embodiment, decreasing the capacitive frame rate may increase the number of samples acquired while driving a set of common electrodes for capacitive sensing. In one implementation, the processing system 110 represents the change in capacitive frame rate by decreasing the ratio R between the touch frame periods and the display frame period (e.g., from 2× to 1.5×). By way of example, assuming a display frame rate of 60 Hz, the capacitive frame rate may be adjusted between 120 Hz (e.g., R=2), to 90 Hz (e.g., R=1.5) to 60 Hz (e.g., R=1) according to interference measurements.

Referring back to step 610, when the measurement of interference is determined to not meet or exceed a threshold amount of interference, at step 620, the processing system 110 determines whether the highest available capacitive frame rate is being used. If there are higher available capacitive frame rates, at step 622, the processing system 110 increases the capacitive frame rate, and proceeds to acquire additional capacitive frames (e.g., at step 604). If there are not any higher available capacitive frame rates, the processing system 110 continues to acquire additional capacitive frames (e.g., at step 604) at the current capacitive frame rate. In some embodiments, as shown in step 620, the processing system 110 may further determine to maintain the current capacitive frame rate if the capacitive frame rate has been decreased recently. By basing an increase of the capacitive frame rate at least in part on the recent history of the capacitive frame rate, the processing system 110 uses the recency of a last decrease as a type of hysteresis loop.

In one embodiment, at step 622, the processing system 110 may increase the capacitive frame rate relative to the display frame rate based on the measurement of interference. In some embodiments, increasing the capacitive frame rate includes decreasing the length of the non-display update periods (e.g., in-frame blanking periods) while also increasing the number of non-display update periods per display frame. In another embodiment, increasing the capacitive frame rate includes switching from driving a common electrode set during multiple non-display update periods (in-frame blanking periods) to acquire a portion of a capacitive frame (i.e., a capacitive frame) to driving the same common electrode set during a single non-display period to acquire a capacitive frame.

In one alternative embodiment of method described in FIG. 6, the processing system 110 may have a pre-determined maximum duration for the non-display update periods (e.g., capacitive sensing period). In such an embodiment, the processing system 110 may vary the amount of non-display update period used for capacitive sensing from shifting gear to gear, as shown in FIG. 7 above, rather than additionally redistributing time between display periods and capacitive sensing periods. In some embodiments, the non-display update periods in a display frame may have equal durations. In various embodiments each gear may have the same number of sensing periods or the number of sensing periods may differ from gear to gear. In some embodiments, the input device may have a pre-determined maximum time budget per display frame for the collection of capacitive measurements, which is selected such that display quality does not suffer, for example, from motion artifacts. In some embodiments, to determine the timing of the non-display update periods, the time budget may be divided by the needed number of non-display update periods per display frame and the ratio R. As described above, the needed number of non-display periods per display frame may be calculated using the expression: $R*(N_{TX}+N_{noise})$ where $N_{TX}$ is a number of transmitter electrodes (e.g., common electrode set) per capacitive frame, and $N_{noise}$ is a number of noise bursts per capacitive frame.

In one embodiment, the number of bursts per cluster may be increased proportionally to the decrease of the capacitive frame rate (e.g., ratio R). For example, switching from a capacitive frame rate of 120 Hz to 60 Hz (e.g., R=2 to R=1) may allow twice as many bursts per cluster. Alternatively, in some embodiments, the number of bursts per cluster may remain the same, in which case, contiguous acquisition of a burst may be broken (e.g., across display frames). As such, it has been determined that in these cases new harmonics in susceptibility to interference may appear. In yet other embodiments, to minimize motion artifacts, consecutive non-display update periods may be used for data collection of samples from a same transmitter electrode (e.g., common electrode set). The use of consecutive non-display update periods may result in increased separation of harmonics in susceptibility to interference in the frequency domain.

In another embodiment, the processing system 110 may change the timing of the non-display update periods (e.g., capacitive sensing periods) and display periods (e.g., pixel update periods) based on the modified capacitive frame rate. An example of re-timed non-display update periods resulting from decreasing the capacitive frame rate (e.g., lowering ratio R) is shown in greater detail in FIGS. 8A and 8B.

Figure 8A:
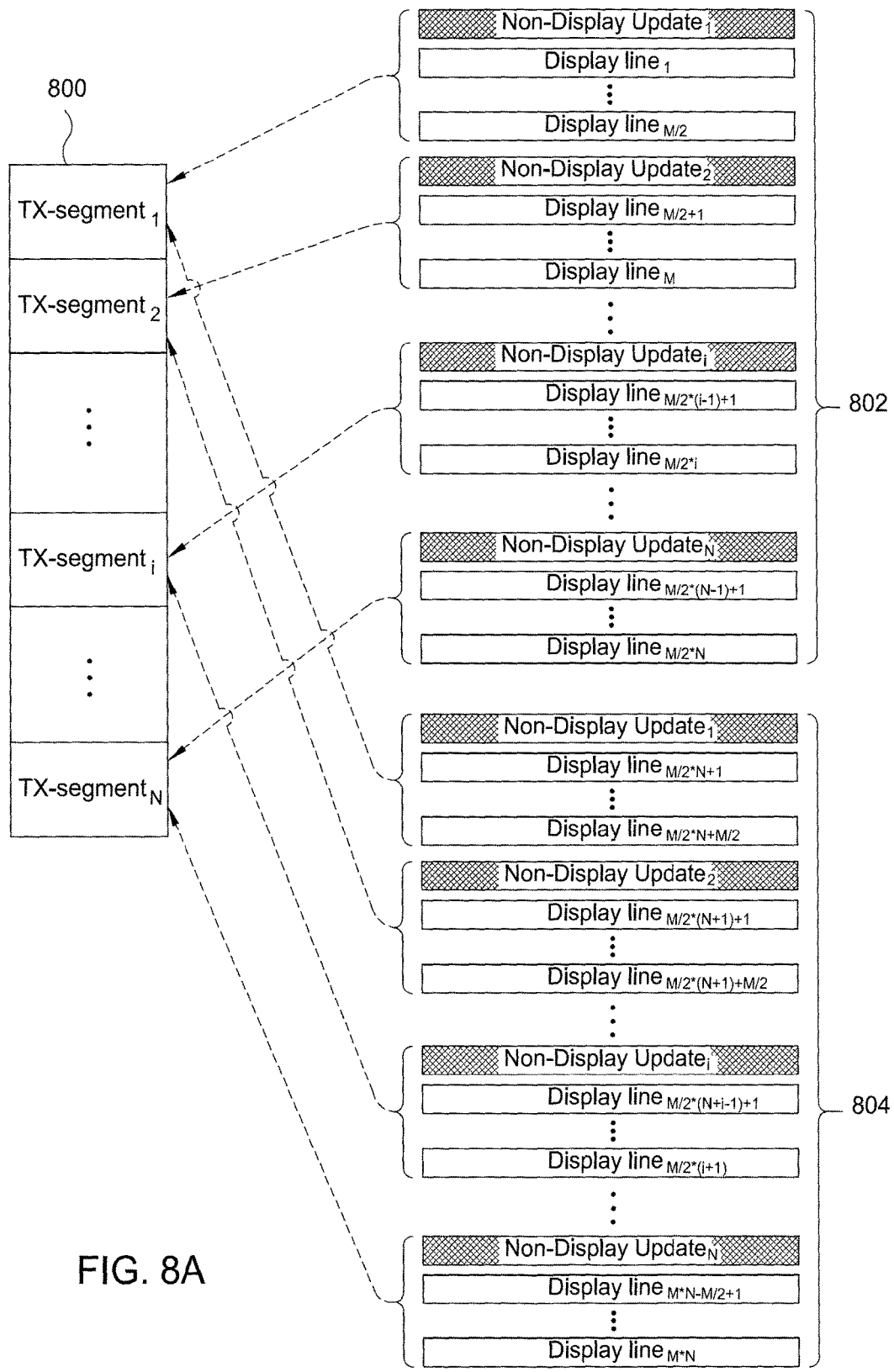
FIGS. 8A-8B are timing charts for processing a display frame with interleaved capacitive sensing periods, according to one embodiment disclosed herein.
Figure 8B:
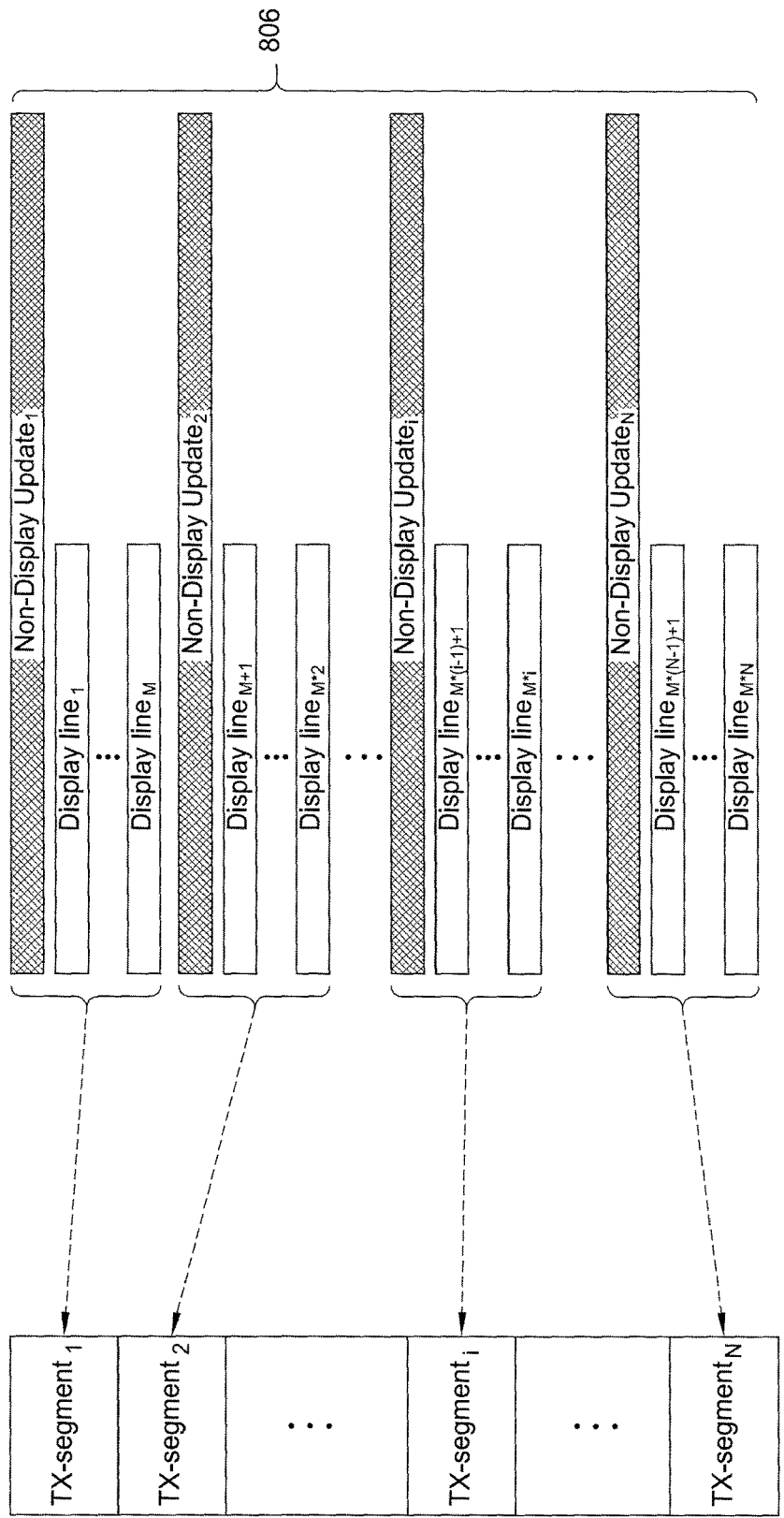

FIGS. 8A and 8B illustrate timing charts for embodiment where the capacitive frame rate is adjusted by increasing the length and number of non-display update periods. In FIGS. 8A and 8B, non-display update periods interleaved with display line update periods are shown for a display device 800 configured to drive common electrodes of common electrode sets for capacitive sensing (e.g., "TX-segment$_1$," "TX-segment$_2$," etc.). In one embodiment, non-display update periods (e.g., Non-Display Update$_1$) are interleaved with display update clusters (e.g., Display Line 1 to Display Line M/2). In the embodiment shown, N common electrode sets are equally sized, each covering M display lines of the display device. However, in other embodiments, one or more of the N common electrode sets may differ in size, where at least one common electrode set covers a number of display lines that is different from the number covered by another common electrode set. In one embodiment, the common electrodes 0 to M*N sequentially transmit signals for display updating during corresponding pixel update periods of common electrodes 0-M*N (e.g., Display Line$_{151}$), while during the non-display update periods (e.g., Non-Display Update$_1$) of the display frame, a set of M common electrodes (e.g., TX-segment$_1$) simultaneously transmit signals for capacitive sensing. For sake of discussion, M is assumed to be an even number, and it may be assumed that noise bursts are not illustrated. While in the embodiment of FIG. 8A each TX-segment corresponds to a non-display period and a plurality of display lines, in various embodiments, multiple TX-segments correspond to the same non-display period, such that multiple TX-segments may be driven for capacitive sensing during a common non-display update period. In one embodiment, multiple TX-segments are simultaneously driven with transmitter signals based on different ones of a plurality mathematically independent code during a common non-display update period. In one embodiment, multiple TX-segments are simultaneously driven with transmitter signals based on different ones of a plurality mathematically independent codes during one or more common non-display update periods.

In the timing chart of FIG. 8A, the capacitive frame rate has been set to be 2× the display frame rate. As shown, the non-display update periods (e.g., "Non-Display Update$_1$," "Non-Display Update$_N$") have a duration that is at least as long as the display line update periods. Further, the non-display update periods are timed within the display frame to achieve the desired 2× capacitive frame rate. In one embodiment, the number of non-display update periods per display frame may be calculated according to the expression $R*(N_{TX}+N_{noise})$, where the ratio R is set according to the current capacitive frame rate, $N_{TX}$ is a number of transmitter segments (e.g., sets of common electrodes), or groups of transmitter segments used in code division multiplexing sensing, per touch frame, and $N_{noise}$ is a number of noise bursts per touch frame.

In one example, in a display device having a number of common electrode sets N=5, each covering a number of display lines M=100, the non-display update periods (e.g., "Non-Display Update$_1$," "Non-Display Update$_N$") are timed for a first capacitive frame 802, which may represent every odd capacitive frame, and a second capacitive frame 804, which may represent every even capacitive frame. In this example, Non-Display Update$_1$ to Non-Display Update$_5$ periods that make up the first capacitive frame 802 are interleaved with display update clusters Display Line$_1$ to Display Line$_{50}$ (e.g., generally as, display line 1 to display line M/2), Display Line$_{51}$ to Display Line$_{100}$ (e.g., display line M/2+1 to display line M), Display Line$_{101}$ to Display Line$_{150}$ (e.g., generally as, display line M/2*(i−1)+1 to display line M/2*i), etc. Further, as shown, a second Non-Display Update$_1$ corresponding to the same first set of common electrodes (e.g., TX-segment$_1$) is interleaved within another display line cluster having Display Line$_{251}$ to Display Line$_{300}$ (e.g., generally as, display line M/2*N+1 to display line M/2*N+M/2) of the same display frame. As shown, in this example, by the time the last display line 500 (e.g., Display Line M*N) is driven for display updating and the display frame has ended, a non-display update period corresponding to each common electrode set segment has occurred twice. As such, a capacitive frame rate double that of the display frame rate has been achieved.

In some embodiments, the capacitive frame rate may be decreased relative to the display frame rate based on a measurement of interference, resulting in a re-timing of the non-display update periods. In the timing chart of FIG. 8B, the capacitive frame rate has been adjusted by increasing the length and number of non-display update periods. It should be recognized an increase in the capacitive frame rate relative to the display frame rate may result in a re-timing of the non-display update periods (e.g., from timing chart in FIG. 8B to the timing chart in FIG. 8A).

In the embodiment of FIG. 8B, the capacitive frame rate has been decreased to be 1× the display frame rate. As shown, the duration of the non-display update periods (e.g., "Non-Display Update$_1$," "Non-Display Update$_N$") have been increased to be longer than the display line update periods. While each non-display update period and corresponding number of display lines are shown as being equal, in various embodiments, one or more of the N common electrode sets may differ in size, where at least one common electrode set covers a number of display lines that is different from the number covered by another common electrode set. Further, as is stated above in regards to FIG. 8A, multiple TX-segments may be simultaneously driven during each non-display update period. In some embodiments, each burst is acquired in contiguous periods. In some embodiments, the non-display update periods are re-timed within the display frame. Continuing the example of the display device where N=5 and M=100, the non-display update periods (e.g., "Non-Display Update$_1$," "Non-Display Update$_N$") which are used for capacitive sensing in the capacitive frame 806, are interleaved with display update clusters Display Line$_1$ to Display Line$_{100}$ (e.g., generally as, display line 1 to display line M), Display Line$_{101}$ to Display Line$_{200}$ (e.g., display line M+1 to display line M*2), Display Line$_{201}$ to Display Line$_{300}$ (e.g., generally as, display line M*(i−1)+1 to display line M*i), etc. As shown, in this example, by the time the last display line 500 (e.g., Display Line M*N) is driven for display updating and the display frame has ended, a non-display update period for each transmitter segment has occurred only once. As such, a capacitive frame rate of 1× the display frame rate has been achieved.

Figure 9:
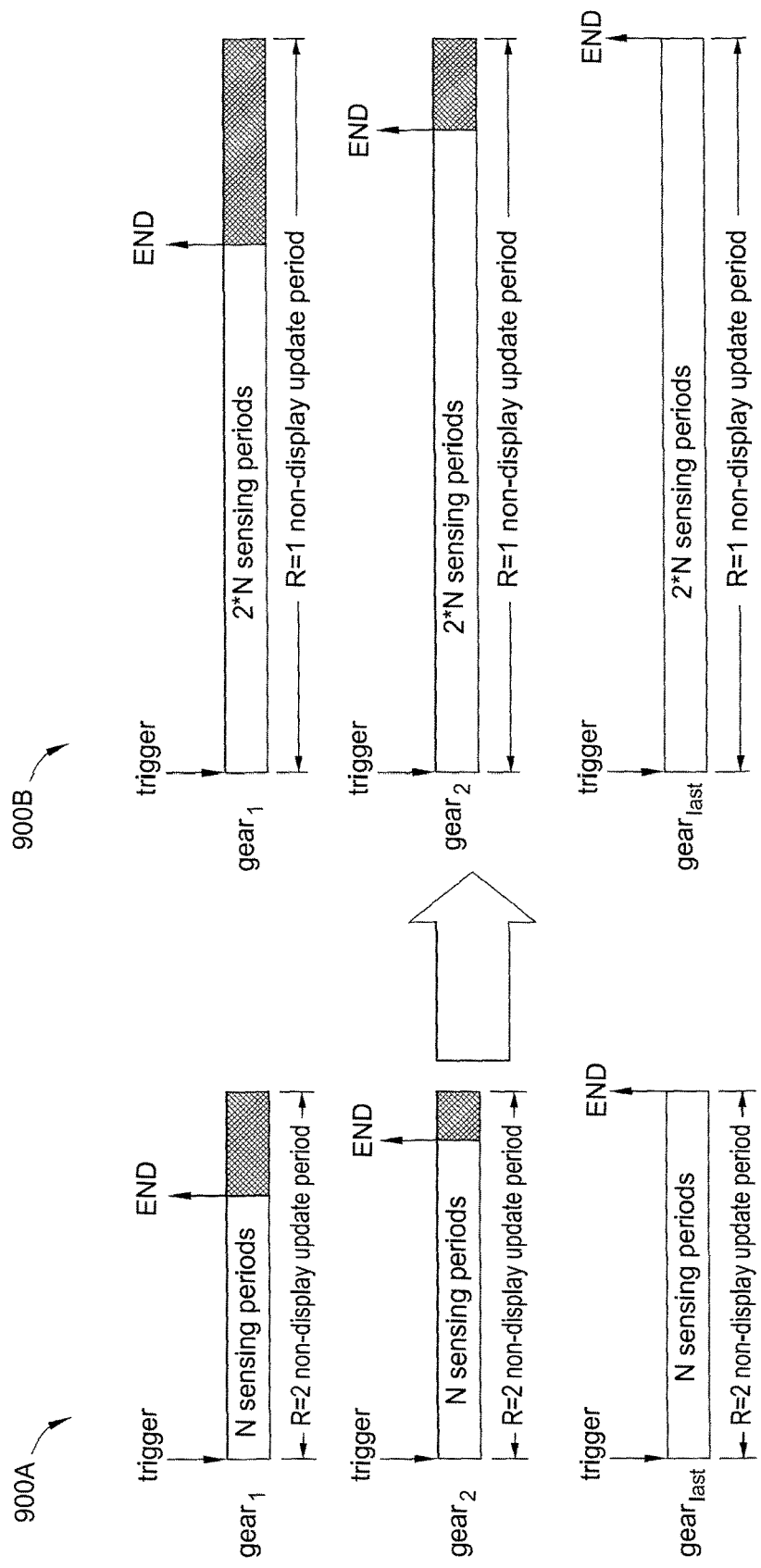
FIG. 9 is a timing chart for processing a display frame with interleaved capacitive sensing periods, according to one embodiment disclosed herein.

FIG. 9 illustrates timing charts 900A and 900B for capacitive sensing periods at different capacitive frame rates, according to one embodiment disclosed herein. As shown in timing chart 900A, three different non-display update periods (e.g., in-frame blanking periods) are illustrated, where each non-display update period is related to a different gear, similar to the non-display update periods shown in FIG. 7. As shown, each gear represents a different amount of the non-display update period that is used for capacitive sensing during N sensing periods. As is stated above, in various embodiments, the number of sensing periods may vary from gear to gear.

In the embodiment shown in timing chart 900B, non-display update periods are re-timed after a decrease in the capacitive frame rate. In one embodiment, the non-display update periods have been increased in length, which allows for an increase number of samples to be acquired per transmitter signal. In some embodiments, a number of samples per burst may be increased proportionally to a decrease in the capacitive frame rate (e.g., the ratio R). For example, a set of the common electrodes may be driven with a transmitter signal having a first transmitter signal frequency to acquire 2*N sensing periods, rather than just N sensing periods, using the same corresponding $gea_{r1}$. The increased number of samples may be used for narrow filter bandwidths, thereby reducing susceptibility to interference during capacitive sensing.

In one embodiment, the non-display update periods have been increased in length, which allows for an increased amount of the non-display update period to be used for capacitive sensing. In some embodiments, decreasing the capacitive frame rate relative to the display frame rate may result in an increase in time budget for frequency hopping as well. The increased amount of the non-display update period to be used for capacitive sensing allows for additional transmitter signal frequencies that were unavailable within non-display update periods of the previous capacitive frame rate. The common electrodes may be driven at a different transmitter signal frequency using one of the additional gears made available by the increase in the non-display update period. As such, changing the capacitive frame rate relative to the display frame rate based on the measurement of interference may increase the range of available sensing frequencies for more effective frequency hopping to more effectively avoid interference. Further, dynamically decreasing the capacitive frame rate based on interference measurements allows for additional time to acquire more samples, which enables for narrower filter bandwidths for filtering resulting signals received on the receiver electrodes. As such, by dynamically adjusting the capacitive frame rate based on interference measurements, embodiments of the invention are able to balance performance and noise mitigation by increasing the capacitive frame rate based on detecting relatively low interference and decreasing the capacitive frame rate based on relatively high interference.

In view of the foregoing, the scope of the present disclosure is determined by the claims that follow. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system, comprising:
    driver circuitry coupled to a plurality of electrodes configured to be driven for display updating and capacitive sensing, wherein the driver circuitry is configured to:
        drive a first electrode for display updating a first display line during a first display line update period of a first display frame,
        drive a second electrode for display updating a second display line during a second display line update period of the first display frame, and
        drive a first electrode set comprising at least one of the plurality of electrodes to generate a capacitive measurement during a first non-display update period of the first display frame, the first non-display update period occurring after the first display line update period and before the second display line update period, and the first non-display update period being at least as long as the first display line update period, wherein display updating is paused during the first non-display update period; and
    a determination module configured to determine an interference measurement based at least in part on the capacitive measurement generated during the first non-display update period, wherein an amount of a second non-display update period which is used for capacitive sensing is adjusted based on the interference measurement.

2. The processing system of claim 1, wherein the determination module is further configured to adjust a capacitive frame rate used during the first non-display update period relative to a display frame rate based on the interference measurement.

3. The processing system of claim 2, wherein the determination module configured to adjust the capacitive frame rate relative to the display frame rate is further configured to adjust a length of the first non-display update period.

4. The processing system of claim 2, wherein the determination module configured to adjust the capacitive frame rate relative to the display frame rate is further configured to drive the first electrode set for capacitive sensing during a third non-display update period of the first display frame, the third non-display update period occurring after the first non-display update period, the first and third non-display update periods comprising a capacitive frame.

5. The processing system of claim 1, wherein the determination module is further configured to increase the amount of the second non-display update period which is used for capacitive sensing.

6. The processing system of claim 1, wherein the determination module is further configured to decrease the amount of the second non-display update period which is used for capacitive sensing.

7. The processing system of claim 1, wherein the driver circuitry is further configured to one of (i) drive the second electrode set with a substantially constant voltage and (ii) electrically float the second electrode set.

8. The processing system of claim 1, wherein the determination module is further configured to shift from driving the first electrode set with a first transmitter signal having a first frequency to driving the first electrode set with a second transmitter signal having a second frequency, wherein the first frequency is different from the second frequency.

9. A processing system, comprising:
    driver circuitry coupled to a plurality of electrodes configured to be driven for display updating and capacitive sensing, wherein the driver circuitry is configured to:

drive a first electrode for display updating during a first display line update period of a first display frame, drive a second electrode for display updating during a second display line update period of the first display frame, and drive a first electrode set comprising at least one of the plurality of electrodes to generate a capacitive measurement during a first non-display period, wherein the first non-display period occurs after the first display line update period and before the second display line update period, and the first non-display period being at least as long as the first display line update period; and a determination module configured to determine an interference measurement the capacitive measurement generated during the first non-display period, wherein the determination module is further configured to adjust an amount of capacitive frames per display frame based on the interference measurement.

10. The processing system of claim 9, wherein the determination module is further configured to adjust a length of the first non-display period.

11. The processing system of claim 9, wherein the determination module is further configured to drive the first electrode set for capacitive sensing during a second non-display period of the first display frame, the second non-display period occurring after the first non-display period, the first and second non-display periods comprising a capacitive frame.

12. The processing system of claim 9, wherein the determination module is further configured to increase an amount of a second non-display period is used for capacitive sensing.

13. The processing system of claim 9, wherein the driver circuitry is further configured to one of (i) drive the first electrode set with a substantially constant voltage and (ii) electrically float the first electrode set.

14. The processing system of claim 9, wherein the determination module is further configured to shift from driving the first electrode set with a first transmitter signal having a first frequency to driving the first electrode set with a second transmitter signal having a second frequency, wherein the first frequency is different from the second frequency.

15. A method, comprising:

driving, a first electrode of a plurality of electrodes for display updating during a first display line update period of a first display frame, wherein the plurality of electrodes are configured for display updating and capacitive sensing;

driving a second electrode of the plurality of electrodes for display updating during a second display line update period of the first display frame;

performing capacitive sensing using a first electrode set comprising at least one of the plurality of electrodes to generate an interference measurement;

adjusting an amount of a first non-display period which is used for capacitive sensing based on the interference measurement; and driving a second electrode set comprising at least one of the plurality of electrodes for capacitive sensing during the first non-display period of the first display frame, the first non-display period occurring after the first display line update period and before the second display line update period, and the first non-display period being at least as long as the first display line update period.

16. The method of claim 15, wherein performing capacitive sensing using the first electrode set to generate the interference measurement comprises one of driving the first electrode set with a substantially constant voltage and electrically floating the first electrode set.

17. The method of claim 15, the method further comprising adjusting a capacitive frame rate relative to a display frame rate based on the interference detection.

18. The method of claim 17, wherein adjusting the capacitive frame rate relative to the display frame rate comprise one of increasing the capacitive frame rate relative to the display frame rate and decreasing the capacitive frame rate relative to the display frame rate.

19. The method of claim 15, wherein adjusting the amount of the first non-display period which is used for capacitive sensing based on the interference detection comprises one of increasing the amount of the first non-display period which is used for capacitive sensing and decreasing the amount of the first non-display period which is used for capacitive sensing.

20. The method of claim 15, wherein adjusting the amount of the first non-display period which is used for capacitive sensing based on the interference measurement comprises shifting from driving the second electrode set with a first transmitter signal having a first frequency to driving the second electrode set with a second transmitter signal having a second frequency, wherein the first frequency is different from the second frequency.

* * * * *